United States Patent [19]

Tokuno

[11] 4,042,234
[45] Aug. 16, 1977

[54] BLANK FEEDING MACHINE

[75] Inventor: Masateru Tokuno, Nishinomiya, Japan

[73] Assignee: Rengo Kabushiki Kaisha, (Rengo Co. Ltd.), Osaka, Japan

[21] Appl. No.: 697,733

[22] Filed: June 18, 1976

[51] Int. Cl.² .................................. B65H 1/30
[52] U.S. Cl. .......................... 271/151; 214/6 D
[58] Field of Search .................. 271/3.1, 150, 151; 214/6 C, 6 D, 1 Q

[56] References Cited

U.S. PATENT DOCUMENTS 3,900,115    8/1975    Kumagai ................ 271/3.1 X
3,955,686    5/1976    Kumagai ................ 271/3.1 X Primary Examiner—Richard A. Schacher
Attorney, Agent, or Firm—Wenderoth, Lind & Ponack

[57] ABSTRACT

A blank feeding machine having a pivoting frame provided with kickers to push up the blanks stacked thereon. It requires only a minimum amount of labor to feed the blanks e.g. to the hopper of a printer even if they are stacked in bundles with face up and down alternately. The machine also includes a mechanism for automatically discharging the blanks from the pivoting frame onto a belt conveyor if they are stacked in uniform orientation.

8 Claims, 15 Drawing Figures

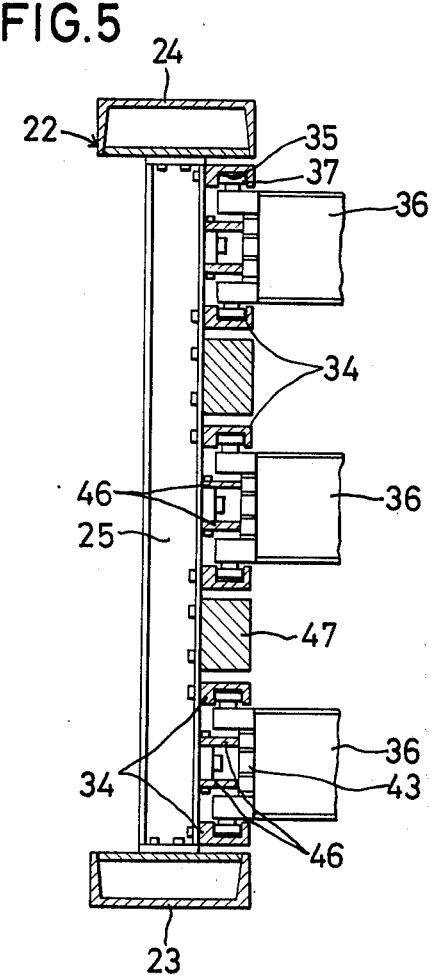
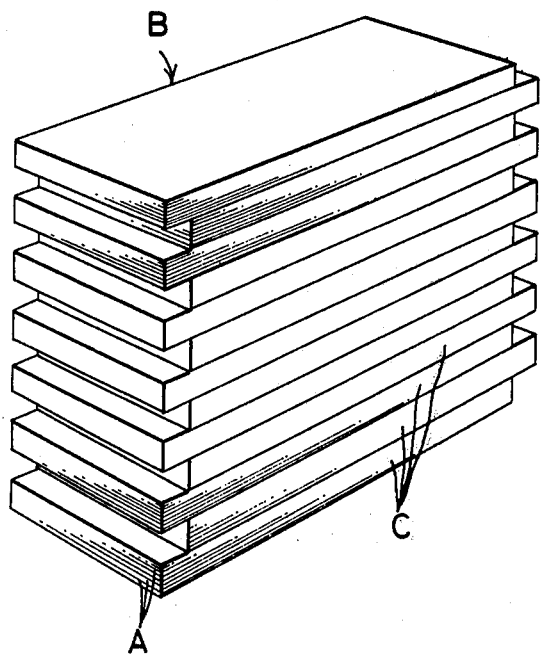
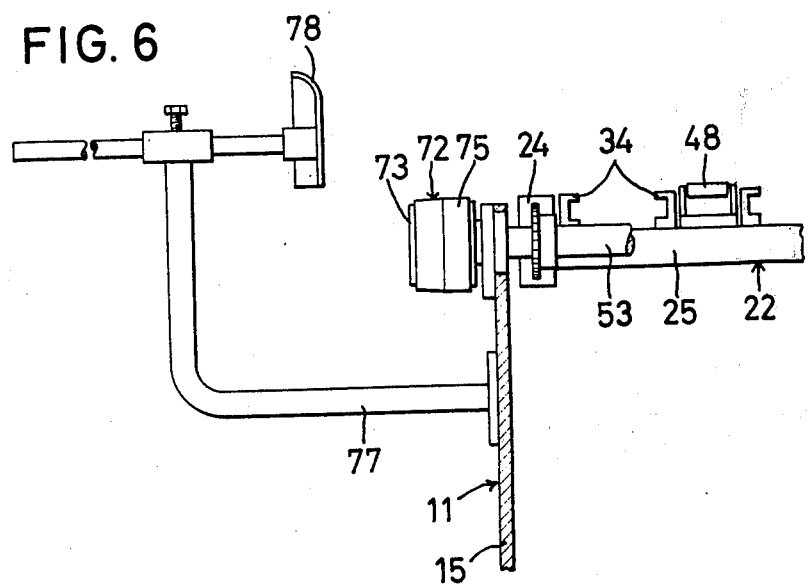

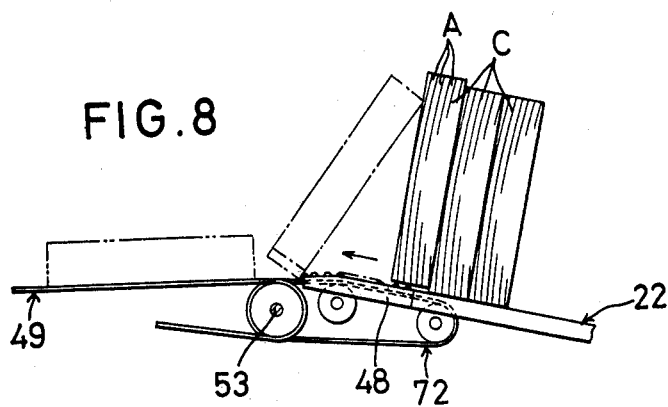
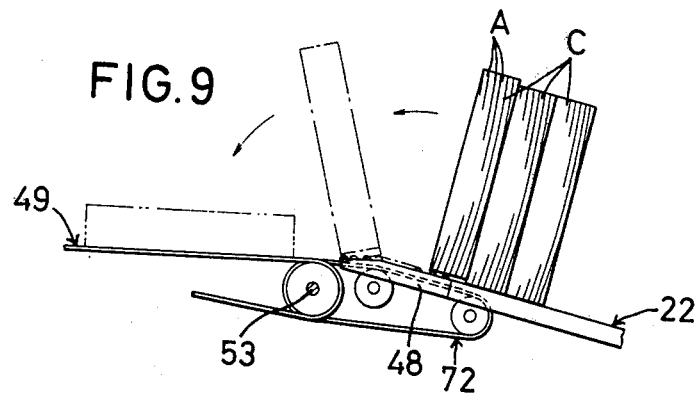
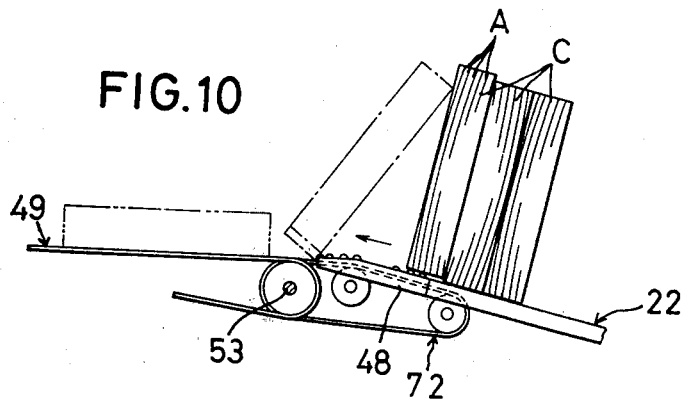
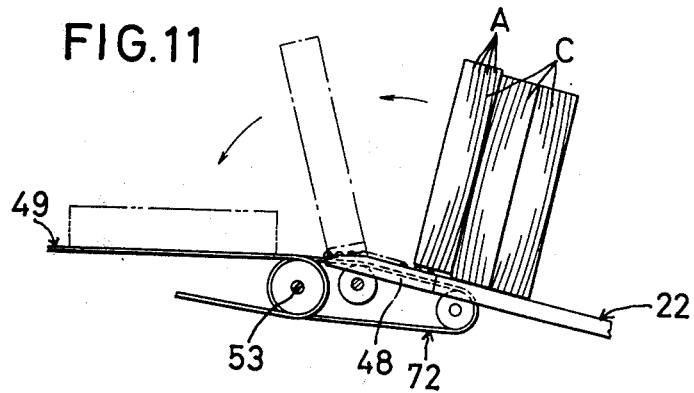

BLANK FEEDING MACHINE

The present invention relates to a machine for feeding blanks or other sheet material to a feed hopper of a printer or the like.

To feed a printer with blanks, for example, blanks are usually pulled out one after another from the bottom of a stack thereof on the feed hopper to which blanks have to be replenished as they reduce in number.

Conventionally, blanks were manually supplied to the feed hopper in small bundles from a stack of blanks adjacent to the hopper. Carrying blanks to the hopper with considerable frequency imposed the worker heavy labor.

A first object of the present invention is to provide a blank feeding machine with which blanks can be fed very efficiently to a feed hopper by a single worker with much lighter labor simply by transferring the bundles of blanks to a belt conveyor from a pivoting frame on which they are stacked.

A second object of the present invention is to provide a blank feeding machine which makes possible efficient transfer of blanks onto a belt conveyor from a pivoting frame on which they are stacked in bundles, whether all the bundles are stacked face up or down or they are stacked face up and down alternately to cure any curling thereof while they are stacked.

A third object of the present invention is to provide a blank feeding machine which not only performs the above-mentioned functions but also includes a mechanism for automatically discharging the blanks, stacked in uniform orientation on the pivoting frame, onto the belt conveyor for transportation thereon in a shingled disposition.

These and other objects are accomplished by the parts, improvements, combinations and arrangements comprising the present invention, a preferred embodiment of which will be shown by way of example in the accompanying drawings and hereinafter described in detail.

In the drawings:

FIG. 5 is an enlarged cross-sectional view taken on line V—V of FIG. 1;

FIG. 6 is an enlarged cross-sectional view taken on line VI—VI of FIG. 1;

FIG. 7 is a perspective view of a stack of blanks piled in bundles;

FIG. 8-11 are diagrammatical views showing how the bundles of blanks are transferred onto the conveyor according to the manner in which they have been piled on the pivoting frame.

Figure 1:
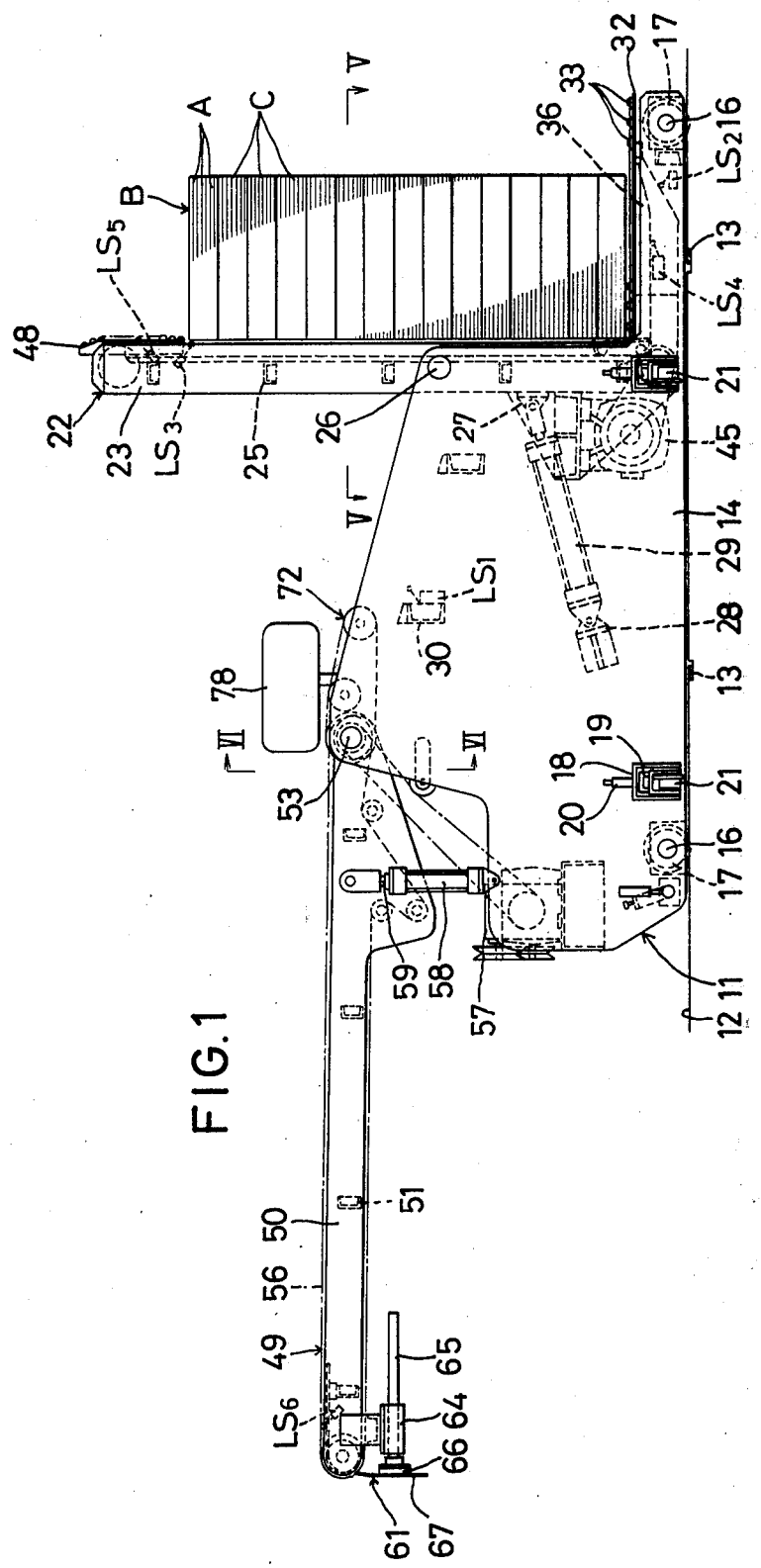
FIG. 1 is a front view of a blank feeding machine according to the present invention.

In FIGS. 1 to 4, the numeral 11 designates a truck adapted to roll selectively on an opposed pair of longitudinal rails 12 laid on the floor and/or another opposed pair of rails 13 perpendicular to the longitudinal rails 12 as will be described later.

The truck 11 includes side plates 14 and 15 opposite to each other with a suitable spacing. At the bottom front and rear thereof the truck 11 has axles 16 rotatably supported by the side plates 14 and 15 at both ends thereof. Wheels 17 are mounted on each end of the front and rear axles 16 to roll on the rails 12 for longitudinal movement of the truck 11.

To the outside of the side plates 14 and 15 are fixed two opposed pairs of supporting frames 18 at the bottom front and bottom rear thereof with a spacing equal to that between the front and rear transverse rails 13. A lifting frame 19 is vertically movably built in each supporting frame 18, through the top wall of which extends a screw rod 20 having its lower end coupled to the lifting frame 19.

In each lifting frame 19 is rotatably mounted a wheel 21 to roll on the respective transverse rail 13. When raised by the screw rods 20, the wheels 21 get off the transverse rail 13 not to interfere with longitudinal travel of the truck 11. When the screw rods 20 are screwed in, the wheels 21 will lower onto the transverse rails 13 while the side plates 14 and 15 are raised so that the front and rear wheels 17 come off the longitudinal rails 12 to allow the truck 11 to roll transversely.

In the rear of the truck 11 is mounted a pivoting frame 22 to be disposed between the side plates 14 and 15. The pivoting frame 22 includes an opposed pair of side struts 23 and 24 coupled together by a plurality of transverse stays 25 parallel to one another with suitable spacings. A shaft 26 passes through the struts 23 and 24 halfway of their length and projects beyond the outer surface thereof at its ends. The shaft 26 is rotatably supported by the side plates 14 and 15 at the top rear portion thereof to permit the pivoting frame 22 to pivot forward therearound.

A bracket 27 is secured to each of the struts 23 and 24 at the lower front thereof and a bracket 28 is fixed to each of the side plates 14 and 15 of the truck 11 at the inside of their lower middle portion. Each pair of the corresponding brackets 27 and 28 are coupled together by a cylinder 29 at each side of the truck 11. When contracted, these cylinders 29 hold the pivoting frame 22 in its upright position. When extended, they cause the pivoting frame 22 to pivot or tilt forward over the truck 11. In order to support the frame 22 thus pivoted, two transverse stays 30 are secured to top of the truck 11 suitably spaced from each other across the side plates 14 and 15.

On the front stay 30 is mounted a limit switch LS1 for detecting the pivoted frame 22. Another limit switch LS2 is provided on the inner surface of the side plate 15 at the bottom rear thereof to detect the pivoting frame 22 return to is upright position. The limit switches LS1 and LS2 control a pressurized fluid supply circuit for the cylinders 29 to stop their contracting and extending action.

The pivoting frame 22 has an opposed pair of table supports 31 secured to the struts 23 and 24 at the bottom thereof to project rearward therefrom. A rectangular table 32 is mounted on the table supports 31 to project rearward horizontally when the frame 22 is in its upright position. On the table 32 are rotatably mounted a plurality of balls 33 in regular arrangement to facilitate loading of blanks onto the table 32.

As shown in FIG. 5, the pivoting frame 22 has a plurality of opposed parallel pairs of vertical rails 34 (three pairs on the preferred embodiment) bolted to the stays 25 from the rear thereof at the crossings therewith between the struts 23 and 24. Each pair of the rails 34 are suitably spaced from each other and have guide grooves 35 formed longitudinally in the inner surface thereof.

The pivoting frame 22 is provided with a kicker 36 for each pair of the rails 34. Each kicker 36 has rollers 37 rotatably mounted on each side of its base, said rollers fitting in the guide grooves 35 formed in the rails 34 to enable the kickers 36 to go up and down therealong. The kickers 36 project rearward with the top surface thereof horizontal when the pivoting frame 22 is in its upright position.

In their lowermost position, the kickers 36 lie below the top surface of the table 32. The table 32 is provided with openings 38 at such positions as to permit free passage of the kickers 36 therethrough.

At the top and bottom of the pivoting frame 22 are provided transverse shafts 39 and 40 parallel to each other which are rotatably carried by the struts 23 and 24 at their ends. Sprockets 41 and 42 are fixed on the upper shaft 39 and the lower shaft 40, respectively, to align with a center line between each pair of the vertical rails 34. An endless chain 43 is stretched over each pair of the upper and lower sprockets 41 and 42.

A motor 45 is mounted on a motor support 44 secured to the struts 23 and 24 at the front lower portion thereof. The lower shaft 40 is chain-driven from the motor 45 to run the endless chains 43 over the sprockets 41 and 42. The chains 43 run vertically between the corresponding pair of the rails 34 therealong. Between each pair of the rails 34 are guides 46 secured to the stays 25 at the crossings therewith to guide the chain 43.

The kickers 36 are secured to their respective chains 43 with their top surface in the same one horizontal plane so as to move up and down along the rails 34 as the chains 43 are driven.

Blanks (A) may be piled in bundles of a suitable thickness on the table 32 on the pivoting frame 22 in one of the following three manners: that is, the blanks may be piled with all the bundles face up (FIG. 8) or down (FIG. 9), or with the bundles face up and down alternately (FIGS. 10 and 11).

In any of these three cases, bundles (C) are piled not to align at their sides but become indented as shown in FIG. 7 to facilitate handling of the blank bundles (C).

The blanks thus stacked in bundles on the table 32 have their front end abutting against the rear surface of the struts 23 and 24 and that of vertical bearing bars 47 secured to the stays 25 from the rear thereof between the adjacent pairs of rails 34. When the pivoting frame 22 is in its pivoted position, the blanks are supported inclined on the abovementioned members, and, as the kickers 36 go up, are pushed up forward sliding on these bearing surfaces.

On top of the pivoting frame 22 is provided a limit switch LS5 for detecting the uppermost bundle (C) of blanks. Slightly below the limit switch LS5 is another limit switch LS3 for limiting the upward movement of the kickers 36. These limit switches are electrically connected to the motor 45 so that when actuated by the upper most blank and the kicker 36, LS5 and LS3 operate to stop the motor 45 from normal rotation, respectively. Under the table 32 is provided a limit switch LS4 which detects the kicker 36 reach the lowermost position to stop the motor 45 from reverse rotation.

Each time one blank bundle (C) is removed from top of the pivoting frame 22, the limit switch LS5 opens to operate the kickers 36 to intermittently push up the stack of blanks until LS5 is actuated again.

Figure 3:
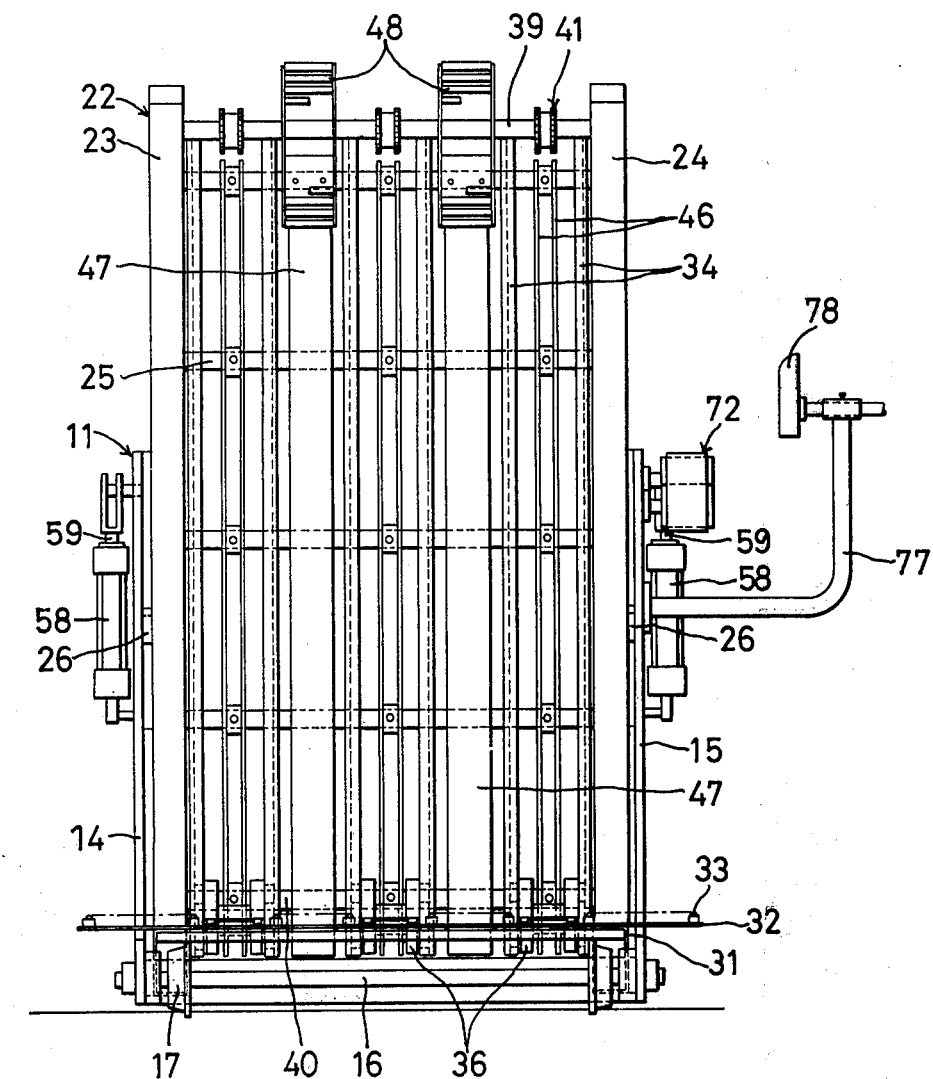
FIG. 3 is a side view thereof as viewed from the right-hand side.
Figure 4:
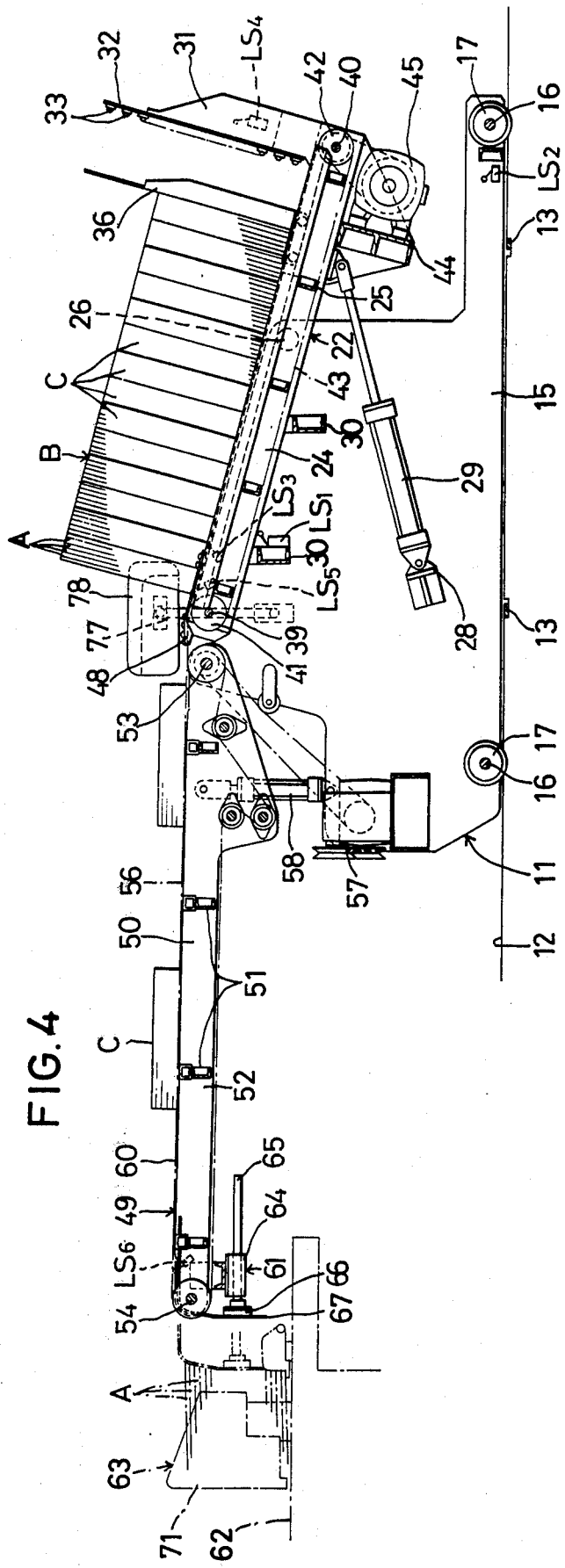
FIG. 4 is a view similar to FIG. 1 showing a pivoting frame in its pivoted position.
Figure 12:
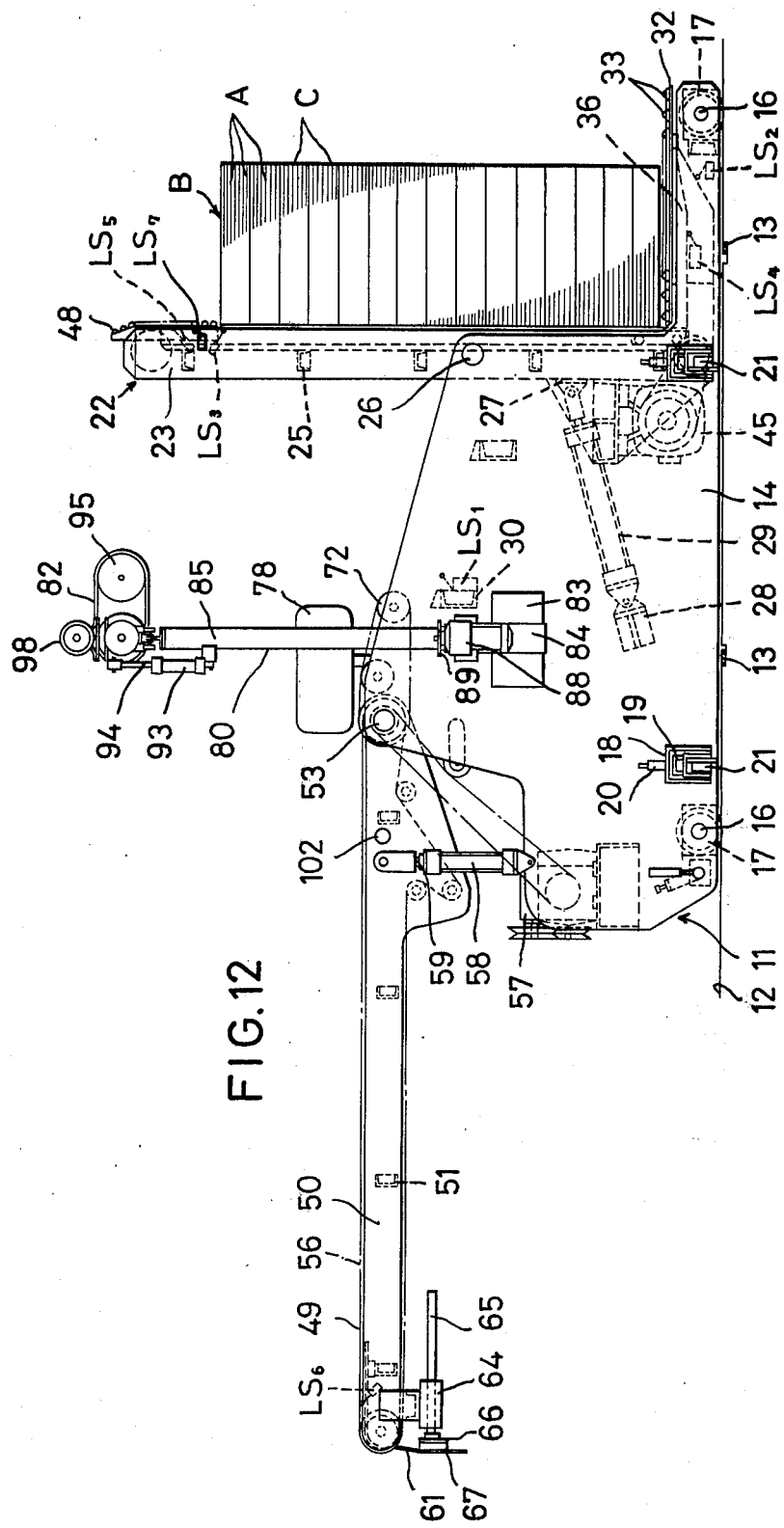
FIG. 12 is a front view of the second embodiment of the present invention further including the mechanism for automatically discharging the blanks from the pivoting frame onto the belt conveyor.
Figure 13:
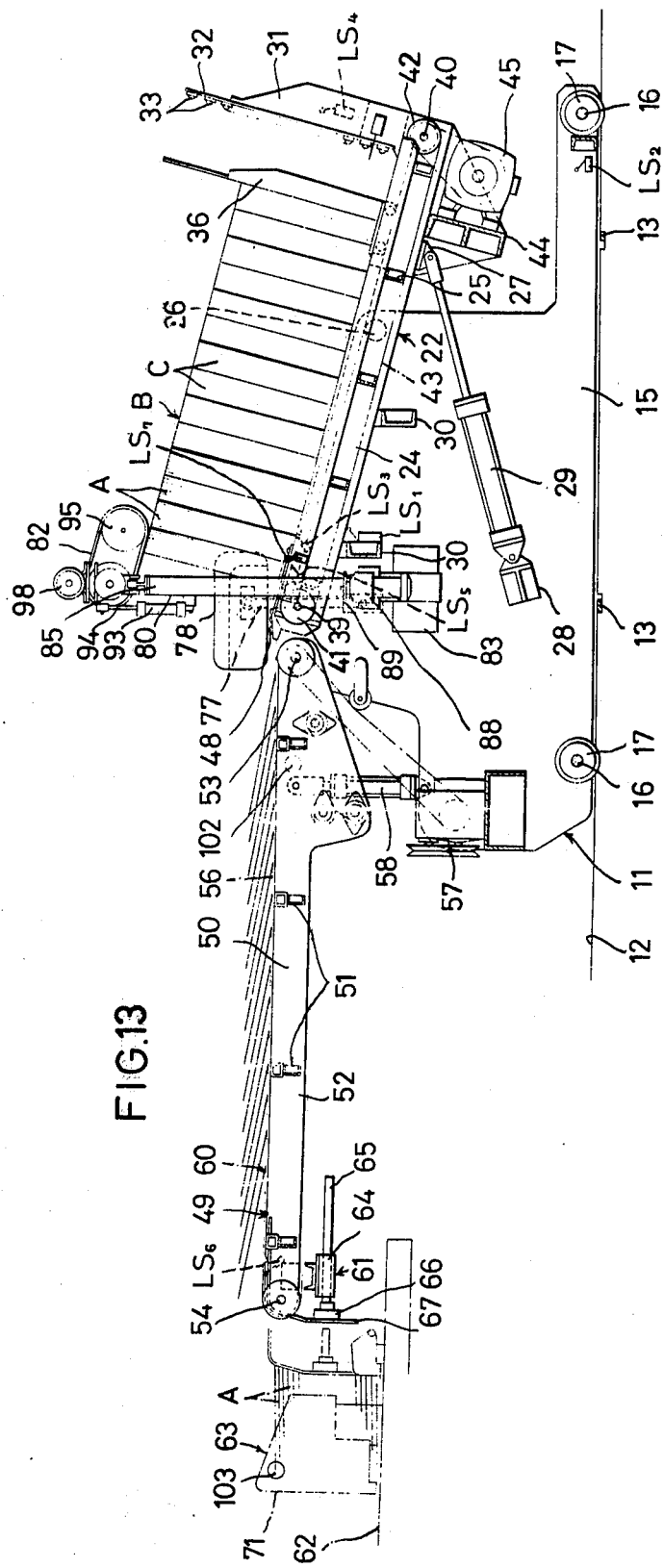
FIG. 13 is a view similar to FIG. 12 with the pivoting frame in its pivoted position.
Figure 14:
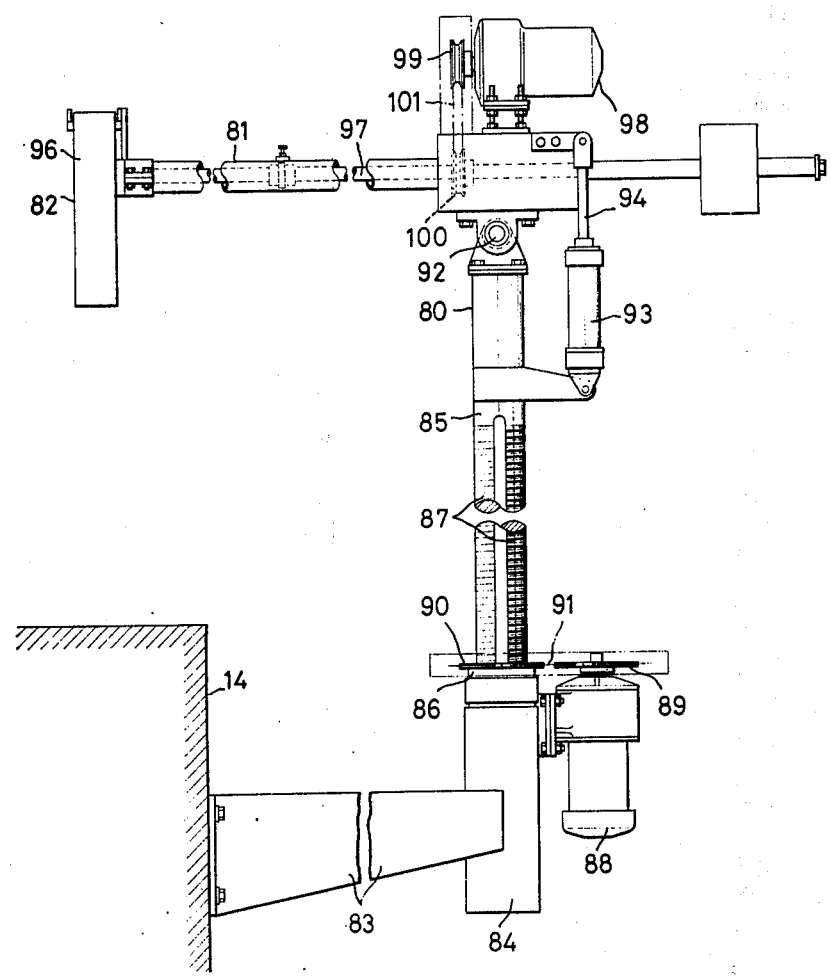
FIG. 14 is a side view of the mechanism for automatically discharging the blanks.
Figure 15:
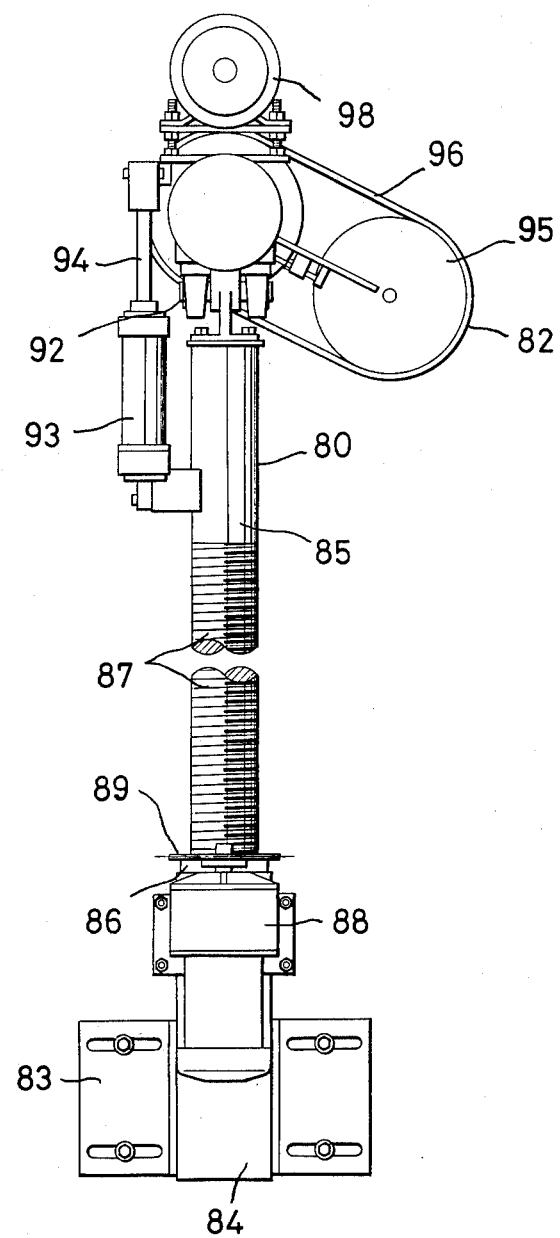
FIG. 15 is a front view of the same.

On top of the pivoting frame 22 is mounted a roller conveyor 48 which extends forward beyond the top of the bearing bars 47 as shown in FIG. 3. This roller conveyor 48 slightly projects beyond the top of the struts 23 and 24 to facilitate manual transfer of blank bundles from the pivoting frame 22 to a belt conveyor 49 described later. Since the abovementioned limit switch LS5 is located halfway of the length of the roller conveyor 48, the upper most blank bundle stops on the roller conveyor 48 when the pivoting frame 22 is in its pivoted position.

Figure 2:
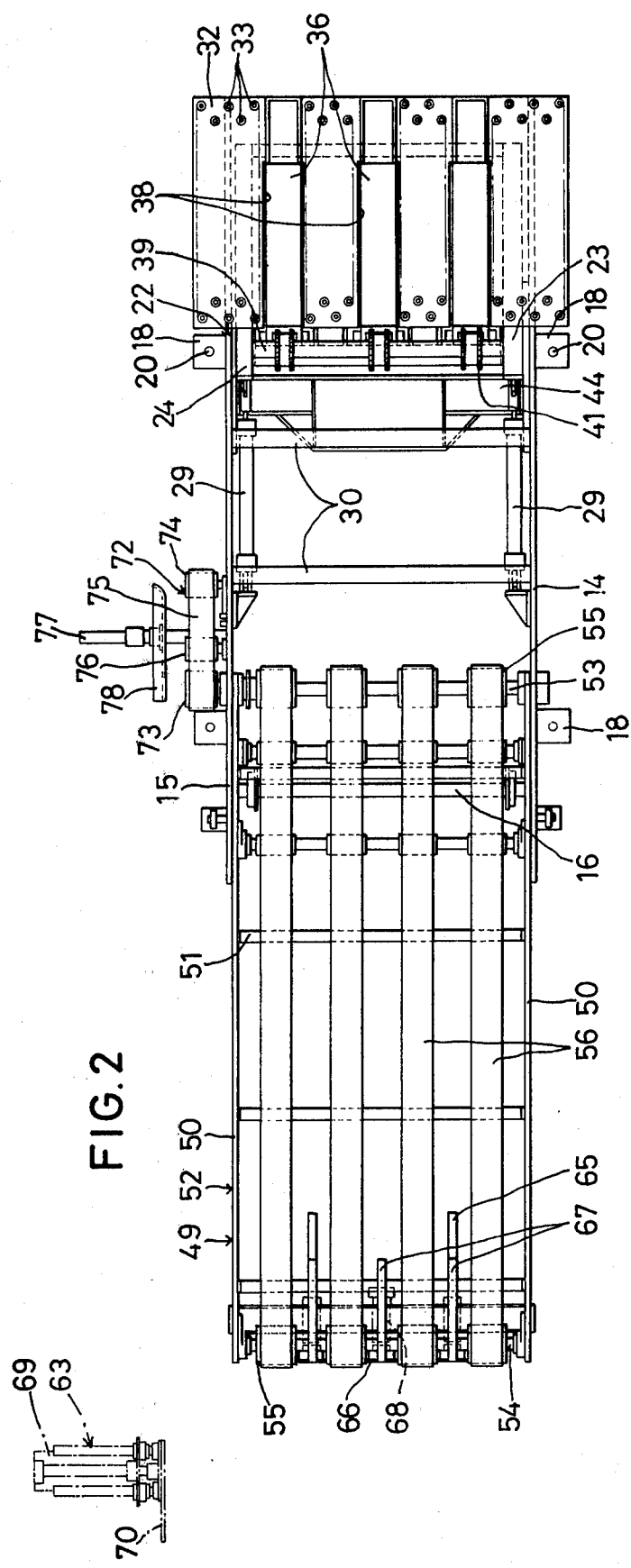
FIG. 2 is a plan view thereof.

In front of the truck 11 is mounted a belt conveyor 49 with its base secured to the truck 11 at the top front thereof and its front end extending forward. The belt conveyor 49 has two elongated side plate members 50 joined together by a plurality of stays 51 to form a frame 52, at the front end and rear ends of which are mounted transverse shafts 53 and 54 with their ends rotatably supported by the plate members 50, respectively. On the shafts 53 and 54 are mounted a plurality of narrow rollers 55 at corresponding positions. As shown in FIG. 2, endless belts 56 narrow in width are stretched over the pairs of the front and rear rollers 55 corresponding to each other.

The transverse shaft 53 at the base of the conveyor belt 49 has its end projecting beyond the plate members 50 and rotatably supported by the side plates 14 and 15 of the truck 11. The shaft 53 is chain-driven from a motor 57 mounted on the front portion of the truck 11 to run the endless belts 56.

The side plate members 50 of the belt conveyor 49 are supported at the rear thereof by piston levers 59 of cylinders 58 mounted on opposite sides of the truck 11 at the front thereof. These cylinders 59 cause the belt conveyor 49 to pivot around the shaft 53, thereby adjusting the height of the front end of the conveyor 49 to that of the hopper of the printer to be paper fed.

The frame 52 has receiving plates 60 for respective conveyor belts 56 secured to the stays 51 under the forward side of the conveyor belts 56 along their running direction to prevent their loosening.

The belt conveyor 49 is provided with a front jogger 61 at the front end thereof, and a side jogger 63 is mounted on the feed hopper 62 of the printer over which the front end of the belt conveyor 49 comes. The front jogger 61 has a plurality of longitudinal movable shafts 65 guided by a guide 64 fixed to the frame 52 at its front bottom. To the front ends of the longitudinal shafts 65 is secured a transverse push lever 66, to the front end of which in turn are attached push plates 67 to be disposed between the belts 56.

The push lever 66 is coupled to a cylinder 68 secured to the frame 52 to impart thereto a reciprocating movement of a fixed stroke to push forward the blanks on the feed hopper 62 through the push plates 67, thereby aligning the end edges of the blanks.

The side jogger 63 (FIG. 2) has a push plate 70 secured to the tip of piston levers of a cylinder 69 mounted on the hopper 62. The cylinder 69 imparts a reciprocating motion to the push plate 70 to push the blanks on their side to align the side edges thereof. The hopper 62 is provided with a paper feed mechanism 71 (not shown) which feeds the blanks to the printer one by one.

Adjacent the front end of the belt conveyor 49 is provided a limit switch LS6 which detects the foremost blank bundle to hold the cylinder 68 for the front jogger 61 and the cylinder 69 for the side jogger 63 in their contracted position for a predetermined period of time until the detected blank bundle has gotten on the hopper 62.

Outside the side plate 15 of the truck 11, a short belt conveyor 72 is provided to extend longitudinally on the boundary between the front end of the pivoted frame 22 and the rear end of the belt conveyor 49. As shown in FIG. 2, the belt conveyor 72 has an endless belt 75 stretched over rollers 73 and 74. The former is mounted on one end of the rear shaft 53 of the belt conveyor 49 projecting beyond the side plate 15, and the latter is mounted on a shaft carried by the side plate 15 in the rear of the roller 73. An intermediate roller 76 on a shaft carried by the side plate 15 supports the forward side of the belt 75 halfway of its length.

The belt conveyor 72 is driven in the same direction as the belt conveyor 49 to be used in manual transfer of the bundles of blanks from the pivoting frame 22 to the belt conveyor 49. In the manual transfer thereof, when one side of the bundle is raised by hand, the other side thereof gets on the short conveyor 72. With the bundle supported only on the other side thereof, it is manually laid down forward or backward according as it has been stacked face down or up on the pivoting frame 22. The short belt conveyor 72 greatly facilitates manual transfer of bundles to the conveyor 49 so that all the blank bundles will be face up thereon.

A rule 78 is mounted on a supporting rod 77 extending from the side plate 15 to be disposed further outside of the belt conveyor 72. While being transferred onto the conveyor 49 through the conveyor 72, the bundles of blanks are pushed against the rule 78 by the worker to align them with one another.

Next, the second embodiment further including a mechanism for automatically letting fall the blanks from top of the pivoting frame 22 onto the belt conveyor 49 will be described. (FIG. 12-15)

The mechanism consists generally of a pillar 80 elevatably supported to one side plate 14 of the truck 11, an arm 81 pivotally mounted on top of the pillar 80 and having its free end disposed over the blanks at the foremost position on the pivoting frame 22, and a belt conveyor 82 mounted on the free end of the arm 81 to have its lower or advancing side running in the same direction as the blanks, which are pushed up on the pivoting frame 22 by the kickers 36.

The pillar 80 allows adjustment of its height according to the width of the blanks stacked on the pivoting frame 22 by means of the arrangement described below.

A tubular member 84 is supported through a pair of brackets 83 to the side plate 14 to be substantially vertical. A shaft 85 constituting the pillar 80 is elevatably mounted in the tubular member 84, said shaft being male threaded from its lower end to a suitable height. A female threaded tube 86 is mounted at top of the tubular member 84 to be rotatable in a fixed position in threaded engagement with the shaft 85. Rotation of the shaft 85 relative to the tubular member 84 is prevented by key and key way provided on the latter and in the former, respectively.

A motor 88 for rotating the female threaded tube 86 is supported by the tubular member 84. A chain 91 is installed over a sprocket 89 on the shaft of motor 88 and over a sprocket 90 on the female threaded tube 86. When the latter is driven by the motor 88, the pillar 80 in threaded engagement therewith goes up and down.

The arm 81 constituted by a pipe is mounted on top of the pillar 80 to be pivotable about a pin 92. A cylinder 93 has its lower end pivoted through a bracket to the pillar 80 adjacent to the top end thereof and its piston 94 has a top end thereof pivoted to the end of the arm 81 opposite to the free end thereof. When actuated, the cylinder 93 pivots the arm 81.

A belt conveyor 82 is mounted on the free end of the arm 81, said conveyor including a pair of pulleys 95 and a belt 96 stretched thereover. A shaft 97 extends through the arm 81. On the outer or free end of the shaft 97 is mounted one of the pulleys 95 and on the inner or fixed end is mounted a sprocket. A motor 98 is mounted on the arm 81 at its fixed end. A belt 101 is stretched over the sprocket on the shaft 97 and a sprocket on the output shaft of the motor 98. The belt conveyor 82 is driven by the motor 98 through the belt-driven shaft 97.

Below the upper side of the belt conveyor 49 adjacent to the pivoting frame 22 is provided a detector 102 with a photoelectric tube. The electrical circuit including the detector 102 is so arranged that as soon as there remain no blanks thereover so that the light therefrom is no longer interrupted, the arm 81 is pivoted up by the cylinder 93 to get the belt conveyor 82 off the blanks. The pivoting of the arm 81 is also done to get the belt conveyor 82 out of the way for the pivoting frame 22.

Another photoelectric detector 103 is provided at the upper portion of the paper feed mechanism 71. When the increasing stack of blanks A on the feed hopper 62 interrupts the light from the detector 103, the kickers 36 and the belt conveyor 49 and 82 are stopped. The electrical circuit is so arranged that removal of the stack of blanks from the hopper 62 puts the kickers 36 and the belt conveyors again into operation.

The manner of operation of the preferred first embodiment will be described below.

Blanks A are first stacked in bundles C on the table 32 at an appropriate position thereof with the pivoting frame 22 in its upright position and the kickers 36 in their lowermost position. The bundles C of blanks may be stacked face up or down, or face up and down alternately, but always in an indented shape as in FIG. 7 for easy handling.

With blanks stacked on the pivoting frame 22, the truck 11 is rolled on the transverse rail 13 and/or the longitudinal rail 12 to such a position that the front end of the belt conveyor 49, the height of which has been adjusted by means of the cylinder 58, comes just over the hopper 62 of the printer to be fed with blanks.

In this condition, a start switch is turned on. Fluid under pressure is supplied to the cylinders 29, which push rearward the pivoting frame 22 on its lower portion. The latter is pivoted counterclockwise around the shaft 26. When it hits the stay 30, the limit switch LS1 thereon operates to deenergize the cylinders 29 so that the pivoting frame 22 stops with its upper portion supported on the truck 11 in its tilted position. (FIG. 4) The blanks are supported inclined on the struts 23 and 24 and the bearing bars 47 against the table 32.

Upon completion of the pivoting of the frame 22, the motor 45 is energized for forward rotation to drive the kickers 36. The stack of blanks is pushed up by the kickers 36 until the uppermost blank actuates the limit switch LS5 to stop the motor 45 with the foremost blank bundle on the roller conveyor 48.

The worker stands at the side of machine opposite to the rule 78 and starts the motor 57 to run the belt conveyors 49 and 72. He holds up one side of the foremost blank bundle while it is carried from the pivoting frame 22 onto the belt conveyor 49, and then lays it down in one of the following three manners:

First, if all the bundles are stacked face up as in FIG. 8, the worker holds up one side of the bundle while pushing it against the rule 78. The bundle is carried forward with only the opposite side on the conveyor 72. The worker lays it down rearward as shown in FIG. 8 by an alternate long and short dash line on the conveyor 49 so that all the blank bundles will run thereon with face up.

Secondly, if all the bundles are stacked face down, each bundle is laid down forward on the conveyor 49 as shown in FIG. 9. Thirdly, if the bundles are piled with face up and down alternately, the worker lets them down forward or backward according as the bundle has been piled face down or up. Namely, if the blank bundle is stacked face up, it is laid down backward as in FIG. 10. If piled face down, it has to be laid down forward as in FIG. 11.

Each time the foremost bundle is removed from top of the pivoting frame 22, the limit switch LS5 opens to re-energize the motor 45 for forward rotation. The kickers 36 go up to lift the stack B of blanks until the foremost blank actuates the limit switch LS5 again, which deenergizes the motor 45 to stop the kickers 36. In other words, each time one blank bundle is transferred onto the conveyor 49, the motor 45 puts the kickers 36 into intermittent operation to bring the next blank bundle to a position most convenient for manual transfer by the worker.

The blank bundles that have been carried by the conveyor 49 are supplied one by one onto the feed hopper 62 from the tip of the conveyor 49. The blanks thus supplied in bundles accumulate on the feed hopper 62. The worker can move blank bundles from the pivoting frame 22 to the conveyor 49 according to the rate at which the blanks are fed from the feed hopper 62 to the printer.

Slightly before being supplied to the feed hopper 62, the blank bundle C on the conveyor 49 actuates the limit switch LS6 to hold the front and side joggers 61 and 63 in their stand-by position for a predetermined time not to obstruct the supply of blank bundles to the feed hopper 62.

After the last blank bundle on the pivoting frame 22 has been moved onto the conveyor 49, the kickers 36 go up and stop at their uppermost position through operation of the limit switch LS3. This completes one cycle of blank feed operation. The worker presses a reset button for the pivoting frame 22. The cylinder 29 contracts to pivot the pivoting frame 22 clockwise until the limit switch LS2 is actuated to stop it in the original upright position. During the pivoting of the frame 22 to the original position, the motor 45 is energized for reverse rotation to lower the kickers 36 until the limit switch LS4 operates to stop them at their lowermost position.

The truck 11 is rolled on the longitudinal and/or transverse rails 12 and 13 to a position convenient for stacking of blanks onto the pivoting frame 22 to make ready for the next cycle of blank feeding.

It will be seen from the foregoing description that the blank feeding machine according to the present invention enables blanks to be very efficiently fed by one personnel to a feed hopper of a printer or the like, even if blank bundles are stacked face up and down alternately to cure any curling thereof to ensure proper processing of the blanks. The worker has only to lay down the blank bundles forward and backward alternately so that they will always be carried face up on the conveyor 49.

Next, operation will be described as to the second embodiment in which the belt conveyor 82 is used to automatically discharge the blanks, stacked in uniform orientation, onto the belt conveyor 49.

When the pivoting frame 22 is pivoted forward until it contacts the limit switch LS7, the cylinder 93 operates to push the piston 94 up. This causes the arm 81 to pivot down about the pin 92 to bring the lower side of the belt conveyor 82 into contact with the upper edges of the blanks stacked on the pivoting frame 22 at the foremost area thereof. The belt 96 causes the blanks to fall forward automatically and sequentially by friction onto the belt conveyor 49 on which the blanks are conveyed in a shingled disposition.

As mentioned before, when the flow of blanks on the belt conveyor 49 ceases, the detector 102 operates to pivot up the discharging conveyor 82 off the blanks by means of the cylinder 93.

While preferred embodiments have been described, variations thereto will occur to those skilled in the art within the scope of the present inventions.

What is claimed is:

1. A blank feeding machine delivering blanks in bundles on a belt conveyor to a feed hopper of a printer comprising a truck movable on at least one pair of rails, a pivoting frame mounted to said truck in the rear thereof to be pivoted forward from its upright position by at least one driving means and provided with a table at the bottom thereof to stack blanks thereon, at least one kicker vertically movably mounted on said pivoting frame for pushing up the stack of blanks intermittently according to the rate at which blanks are fed to the feed hopper, when said pivoting frame is in its pivoted position, a first belt conveyor provided in front of said truck to extend forward therefrom with the rear end thereof adjacent to the front end of said pivoting frame in its pivoted position for delivering the blanks transferred in bundles from said pivoting frame with one side thereof held by the worker, and a second belt conveyor mounted to the pivoting frame to be disposed outside of the boundary between the front end of the pivoting frame in its pivoted position and the rear end of said first belt conveyor for carrying the bundles of blanks forward with only the outer side thereof supported thereon when they are transferred from the pivoting frame to said first belt conveyor.

2. A blank feeding machine as claimed in claim 1, in which a plurality of balls are rotatably mounted on said table of the pivoting frame.

3. A blank feeding machine as claimed in claim 1, in which said pivoting frame is provided with a roller conveyor at the top thereof.

4. A blank feeding machine as claimed in claim 1 further comprising a rule which is disposed outside of said second belt conveyor and against which the bundles of blanks are pushed to align them with one another on said first belt conveyor when they are transferred from the pivoting frame to the first belt conveyor.

5. A blank feeding machine as claimed in claim 1 further comprising a side jogger and a front jogger disposed adjacent the front end of the first belt conveyor for jogging the bundle of blanks on the feed hopper to align the side and end edges thereof, respectively.

6. A blank feeding machine as claimed in claim 1, in which blanks in bundles are efficiently fed whether they are piled in the pivoting frame with all the bundles face up or down, or with them face up and down alternately.

7. A blank feeding machine as claimed in claim 1 further comprising means for automatically discharging the blanks from said pivoting frame onto said first belt conveyor, said automatic discharging means comprising: a pillar supported to the side plate of the machine, an arm pivotally mounted on top of said pillar, a third belt conveyor mounted on the free end of said arm for causing the blanks on said pivoting frame to fall sequentially onto said first belt conveyor by friction when it is in its operative position, and means for pivoting said arm to bring said third belt conveyor into and out of its operative position.

8. A blank feeding machine as claimed in claim 7 in which said pillar is adapted to be elevatable according to the width of the blanks to be fed.

* * * * *